MECHANICAL OSCILLATION GENERATOR

Filed June 25, 1965 2 Sheets-Sheet 1

INVENTOR:
JOSEF NEUBAUER
By Silverman + Cass
Att'ys

Nov. 29, 1966 J. NEUBAUER 3,287,984

MECHANICAL OSCILLATION GENERATOR

Filed June 25, 1965 2 Sheets-Sheet 2

A-A"

B-B"

INVENTOR:
JOSEF NEUBAUER

By Silverman + Cass
ATT'YS

United States Patent Office
3,287,984
Patented Nov. 29, 1966

3,287,984

MECHANICAL OSCILLATION GENERATOR

Josef Neubauer, Petersberg, Kreis Hersfeld, Germany, assignor to Firma Zuse K.G., Bad Hersfeld, Germany Filed June 25, 1965, Ser. No. 466,957
Claims priority, application Germany, June 25, 1964, Z 10,937
16 Claims. (Cl. 74—84)

The invention is concerned generally with a mechanical oscillation generator and more particularly concerns an oscillation generator for generating a rotary motion which periodically changes between zero and maximum speed through superposition of the rotary motions of two drive elements which are propellable by a common driving shaft, the first drive element performing a uniform rotary motion and the second a periodically changing rotary motion.

The primary object of the present invention is to provide a very simple and compact mechanical oscillation generator and to construct it in such a way that the rotary speed of the output shaft of the oscillation generator changes sinusodially beween zero and a maximum speed thus attaining a uniform acceleration flow during the speed minima and speed maxima.

This problem is solved by the invention in that the first drive element is propellable by the driving shaft through a transmission train of gears and carries a link representing said second drive element. This second drive element is normally slidable with respect to its axis of rotation, and equipped with a connecting link guide, normally running with this direction of displacement and with the axis of rotation, with a driving pin arranged eccentrically relative to the axis of rotation, engaging into said connecting link guide, said guide being connected to the driving shaft and secured against rotation; and in that there is a lever mounted and secured against rotation on at least one output shaft which is arranged coaxially with said axis of rotation, said lever engaging with an axis-parallel eccentric pin into a guide slot which is arranged on the link as an elongation of said connecting link guide.

Certain objects of the invention are to provide the several advantageous features mentioned hereinafter.

One advantageous feature of the invention consists in that several coaxial output shafts are in driving connection with the link through each axis-parallel eccentric pin which engages into the respective catch slots.

Still another advantageous feature of the invention consists in that the first drive element is rotatably mounted on the driving shaft.

A further advantageous feature of the invention consists in that the gear ratio of the transmission train is such that the rate of rotation of the first drive element is is related with respect to the rate of rotation of the driving shaft as the eccentricity or moment-arm of the driving pin is related to the eccentricity or moment-arm of the axis-parallel pin on the lever which is mounted on the output shaft.

A further advantageous feature of the invention consists in that the second drive element is designed as a rectangular crosspiece with one of the arms of the cross being equipped with the connecting link guide and the guide slots while the other arm is slidably guided between guide rollers which are rotatably mounted on the first drive element.

Still a further advantageous feature of the invention consists in that the first drive element is designed as a flat disk with a central toothed rim, said toothed rim being in driving connection with the drive shaft through said transmission train gear and, furthermore, with the end of the driving shaft carrying the eccentric driving pin, protruding through the central opening of said disk.

Finally, still another advantageous feature of the invention consists in that the driving shaft, the output shaft and the transmission train are all mounted in or on a common housing.

In the following specification the invention is more precisely explained on the basis of the preferred embodiment shown in the drawings.

Figure 1:
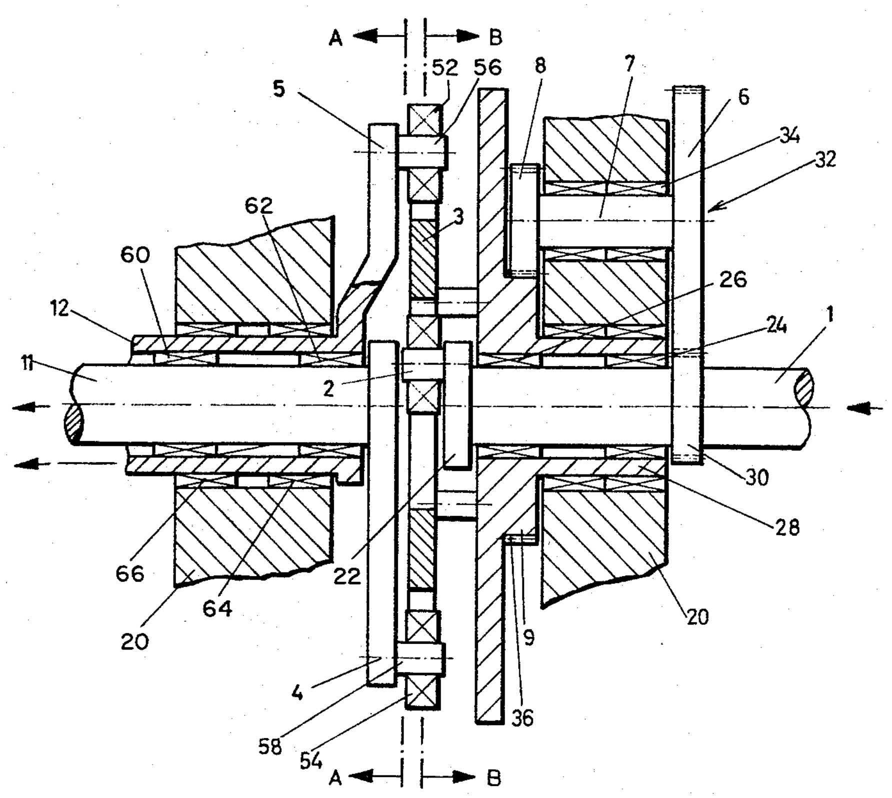
FIG. 1 shows a longitudinal section of a mechanical oscillation generator constructed according to this invention, showing a fragmentary portion of the housing mounting the same.
Figure 3:
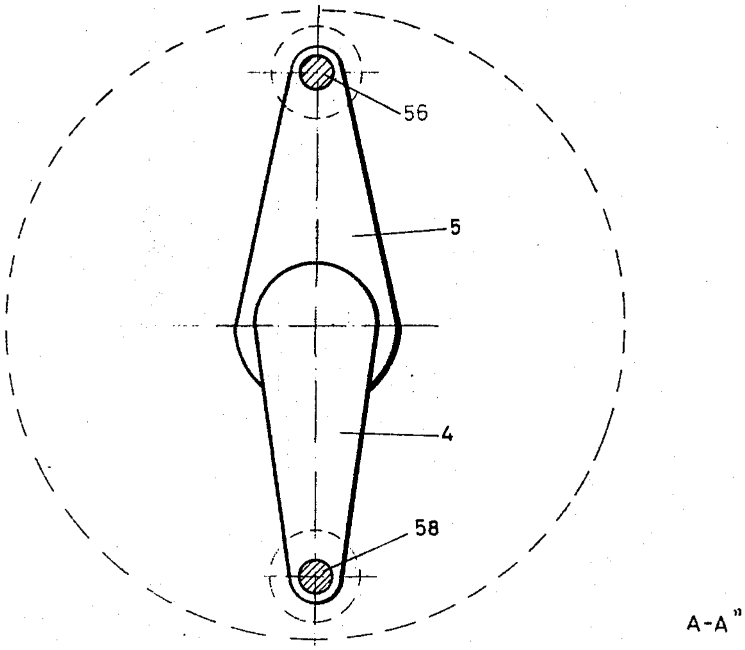
FIG. 3 is a schematic sectional view partially in elevation, taken along the line A—A of FIG. 1.
Figure 2:
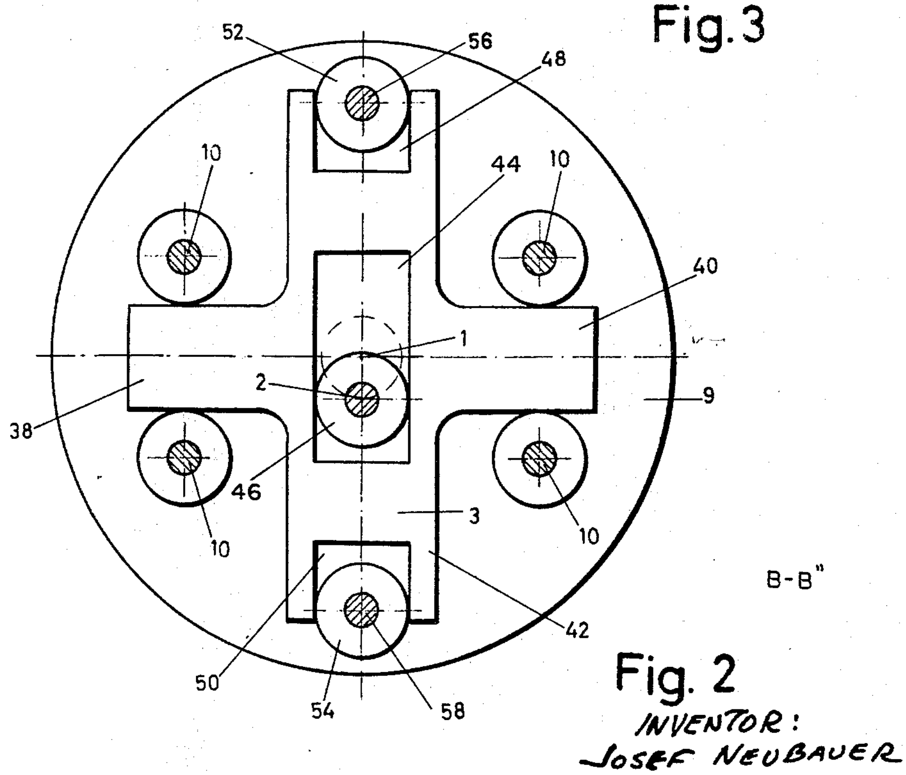
FIG. 2 is a schematic sectional representation partially in elevation, taken along the line B—B of FIG. 1.

The oscillation geneartor is driven by a central driving shaft 1, whose left end 22, located inside of the housing 20 has an eccentric driving pin 2. Separated from the driving shaft 1 by bearing 24 and 26 is the first drive element 9, formed as a disk with a coaxial hub 28, said drive element being rotatably journalled on the driving shaft 1. A toothed wheel 30, secured against rotation, is connected to the driving shaft 1 outside of the housing 20, said toothed wheel engaging in a transmission gear train 32. This train 32 consists of a transmission gear shaft 7 which is rotatably mounted in the housing 20 by means of bearings 34 and of the two spur gears 6 and 8. The spur gear 6 engages in the toothed wheel 30 and the spur gear 8 engages in a central toothed rim 36 which is mounted on the disk 9.

The disk 9 carries four idling guide rollers 10 rectangularly positioned, between which lateral arms 38 and 40 of a second drive element 3 are located. The arms 38 and 40 comprise a crosspiece which is slidably mounted to move in a plane normal to the axis of rotation of the disk 9 but only on a diametric line which intersects the axis. The arm 42 of the crosspiece has a central link guide 44 arranged normal to the line of displacement of the arms 38 and 40. The eccentric driving pin 2 engages in said link guide 44 by means of an idler roller 46 which is rotatably mounted on said driving pin.

Both ends of the arm 42 are provided with fork-shaped guide slots 48 and 50 which open radially outwardly and in which are engaged the respective rollers 52 and 54 mounted on the pins 56 and 58. The pin 56 is located on the free end of a lever 5 and the pin 58 is on the free end of a lever 4. These levers are fixedly secured to the output shafts 12 and 11, respectively, said shafts being coaxial with each other and with the driving shaft 1. The output shaft 12 is a tubular shaft enclosing the output shaft 11 and is rotatably mounted on said shaft journalled by means of bearings 60 and 62. The hollow shaft 12 is rotatably journalled in the housing 20 by means of bearings 64 and 66.

When a uniform rotary motion is transmitted to the drive shaft 1 the crosspiece 3 is periodically moved backward and forward through the driving pin 2 by means of the link guide 44 within the straight-line path fixed by the guide rollers 10. At the same time a uniform rotary motion is transmitted through the transmission train 32 to the disk 9 which may be at a different rate than the rotary motion of the driving shaft. In addition to the backward and forward motion, the rotary motion of the disk 9 is in this way also transmitted through the guide rollers 10 to the crosspiece 3 so that the crosspiece 3 carries out a motion which is a combination of this backward and forward motion and of the rotary motion of the disk 9. This combined motion is transmitted to the output shafts 12 and 11 by means of the catch slots 48 and 50 through the pins 56 and 58 and the cranks 5 and 6.

By selecting the proper eccentricity or moment-arms for the driving pin 2 and for the pins 56 and 58 and by proper selection of the gear ratio in the transmission train 32 the arrangement can be constructed such that the maximum speed of the periodic to-and-fro motion of the crosspiece 3 reaches the same absolute speed as the circumferential speed of the disk 9 at a radial distance from the axis of rotation which corresponds with the eccentricity or moment-arms of the pins 56 and 58. In such a case the resulting rotary motion of the crosspiece 3 is always delayed toward zero motion when the circumferential speed of the disk 9 and the speed of the linear motion of the crosspiece 3 between the guide rollers 10 are inversely equal. For this the following condition must be present:

$$\frac{L_1}{L_2}=\frac{n_2}{n_1}$$

wherein $L_1$ represents the eccentricity or moment-arm of the driving pin 2 relative to the axis of rotatiotn of the driving shaft 1, $L_2$ represents eccentricity or moment-arm of the cranks 4 and 5 relative to said axis of rotation, $n_1$ is the rate of rotation of the driving shaft 1 and $n_2$ is the rate of rotation of the disk 9.

As a result of rotary motion, a sinusoidal oscillation is then transmitted to the pins 56 and 58. This oscillation changes periodically between zero and a maximum speed. At an assumed clockwise rotation of the disk 9 the pin 56 will always pass through its maximum speed in opposite direction relative to the motion of the disk circumference, like the pin 58. Therefore, out-of-phase oscillatory motions can be tapped off from the output shafts 11 and 12. Obviously one shaft such as 11 or 12 may be used alone, or may not be provided, where two oscillatory motions are not needed.

Variations are capable of being made without departing from the spirit or scope of the invention as defined in the attached claims.

What is desired to secure by Letters Patent of the United States is:

1. A mechanical oscillation generator which comprises a housing, a driving shaft journalled in said housing for rotation thereof, at least one driven shaft also journalled in said housing coaxially of said driving shaft and providing the output of said generator thereat, first and second drive elements coupled together for common rotation, the first drive element being journalled in said housing coaxially with but independently of said driving shaft, a transmission train of known ratio connected between said driving shaft and first drive element for rotating said first drive element at a rotational speed dependent upon said ratio, means coupling the second drive element and driving shaft together comprising an eccentric pin-and-slot connection of a first moment-arm whereby to impart oscillating movement to said second drive element during rotation of said driving shaft, means on said drive elements cooperating to confine the oscillating movement of said second drive element to a diametrical line transverse of the axis of said shafts, a crank of a second moment-arm secured to said driven shaft and having a radially slidable connection at the end of said monemt-arm with said second drive element lying on a second diametrical line, whereby the movement imparted to said driven shaft responsive to the driving shaft is both rotary and oscillatory.

2. A mechanical oscillation generator as claimed in claim 1 in which the oscillating movement of the driven shaft is sinusoidal.

3. A mechanical oscillation generator as claimed in claim 2 in which the moment-arms and ratios are chosen to provide a condition in which the maximum speed of the periodic movement of the driven shaft occurs at the same absolute circumferential speed as the first drive element when the radial distance from said axis to the connection of said crank with the second drive element is equal to the second moment-arm.

4. A mechanical oscillation generator as claimed in claim 3 in which the ratios and moment-arms are defined as $$\frac{L_1}{L_2}=\frac{n_2}{n_1}$$

where:

$L_1$ is the length of the first moment-arm,
$L_2$ is the length of the second moment-arm,
$n_1$ is the rate of rotation of the driving shaft and
$n_2$ is the rate of rotation of the first drive element.

5. A mechanical oscillation generator as claimed in claim 1 in which there is a second driven shaft having a second crank secured thereto, the moment-arm of the cranks being the same, the driven shafts being coaxial, the second crank having a radially slidable connection at the end of its moment-arm with said second drive element on the said second diametrical line but on the diametrically opposite side of the axis of said driven shafts, whereby the oscillatory movements of said driven shafts will be out of phase.

6. A mechanical oscillation generator as claimed in claim 5 in which there is a second driven shaft having a second crank, a mechanical oscillation generator as claimed in claim 3 in which the ratios and moment-arms are defined as $$\frac{L_1}{L_2}=\frac{n_2}{n_1}$$

where:

$L_1$ is the length of the first moment-arm,
$L_2$ is the length of the second moment-arm,
$n_1$ is the rate of rotation of the driving shaft and
$n_2$ is the rate of rotation of the first drive element.

7. A mechanical oscillation generator as claimed in claim 1 in which the radially slidable connection comprised a radial guideway formed in said second drive element and a pin on said crank, the pin having its axis parallel with the axis of the driven shaft and engaging into and confined in its movement by said guideway.

8. A mechanical oscillation generator as claimed in claim 5 in which the radially slidable connections comprise radial guideways formed in said second drive element on diametrically opposite sides thereof and a pin on each of said cranks, the pins having their axes parallel with the axes of the driven shafts and engaging into and confined respectively in their movements by said guideways.

9. An oscillation generator as claimed in claim 1 in which the first drive element is journalled on said driving shaft.

10. An oscillation generator as claimed in claim 5 in which the first drive element is journalled on said driving shaft.

11. An oscillation generator as claimed in claim 1 in which the second drive element is of generally cruciform configuration, the coupling means between said driving shaft and second drive means comprising an eccentric pin on said driving shaft and a rectilinear slotted guideway formed in the center of said second drive element engaged by said eccentric pin, the guideway being aligned with one cross-arm of said cruciform configuration, said radially slidable connection comprising a second pin on said crank and a radial guideway formed on one end of said one cross-arm aligned with said center guideway, the second pin being engaged in said radial guideway.

12. An oscillation generator as claimed in claim 11 in which said means for confining oscillating movement of said second drive means comprises a plurality of spaced rollers on said first drive means and the second cross-arm of said cruciform configuration having opposed rectilinear edges engaged by said rollers.

13. An oscillation generator as claimed in claim 5 in which the second drive element is of generally cruciform configuration, the eccentric pin-and-slot connection between said driving shaft and second drive means comprising an eccentric pin on said driving shaft and a rectilinear slotted guideway formed in the center of said second drive element engaged by said eccentric pin, the guideway being aligned with one cross-arm of said cruciform configuration, said radially slidable connections each comprising a projection on the respective cranks and radial guideways formed on diametrically opposite ends of said cross-arms aligned with said center guideway, each projection engaging in a respective one of said radial guideways.

14. An oscillation generator as claimed in claim 13 in which said means for confining oscillating movement of said second drive means comprises a plurality of spaced rollers on said first drive means and the second cross-arm of said cruciform configuration having opposed rectilinear edges engaged by said rollers.

15. An oscillation generator as claimed in claim 1 in which the first drive element is a flat disk having a central toothed hub, the transmission train including gears coupled at one end of said train with said toothed hub and at the other end of the train with said driven shaft, the disk having an axial passageway, the driving shaft extending through said passageway, and said coupling means between said driving shaft and second drive means being located on the axial side of said first drive means opposite to the location of said transmission train.

16. An oscillation generator as claimed in claim 5 in which said means for confining oscillating movement of said second drive means comprises a plurality of spaced rollers on said first drive means and the second cross-arm of said cruciform configuration having oppoed rectilinear edges engaged by said rollers.

References Cited by the Examiner

UNITED STATES PATENTS

| | | | |
|---|---|---|---|
| 1,721,408 | 7/1929 | Perdreau | 74—393 |
| 2,215,762 | 9/1940 | Morrison. | |
| 2,374,718 | 5/1945 | Andrew | 74—67 |
| 2,498,036 | 2/1950 | Grace | 74—393 |

FOREIGN PATENTS

| | | |
|---|---|---|
| 670,090 | 9/1963 | Canada. |

FRED C. MATTERN, Jr., *Primary Examiner.*

D. H. THIEL, *Assistant Examiner.*